US008619251B2

(12) United States Patent
Souvestre et al.

(10) Patent No.: US 8,619,251 B2
(45) Date of Patent: Dec. 31, 2013

(54) DEVICE AND METHOD FOR MEASURING THE POSITION OF AT LEAST ONE MOVING OBJECT IN A THREE-DIMENSIONAL GRID

(75) Inventors: Florent Souvestre, Fontenay-aux-Roses (FR); Moustapha Hafez, Arcueil (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 395 days.

(21) Appl. No.: 13/130,289

(22) PCT Filed: Nov. 23, 2009

(86) PCT No.: PCT/EP2009/065600
§ 371 (c)(1),
(2), (4) Date: May 19, 2011

(87) PCT Pub. No.: WO2010/058001
PCT Pub. Date: May 27, 2010

(65) Prior Publication Data
US 2011/0228252 A1    Sep. 22, 2011

(30) Foreign Application Priority Data
Nov. 24, 2008    (FR) .................................... 08 57946

(51) Int. Cl.
*G01S 7/481*    (2006.01)
*G01S 17/66*    (2006.01)
(52) U.S. Cl.
CPC ............. *G01S 7/4812* (2013.01); *G01S 7/4813* (2013.01); *G01S 17/66* (2013.01)
USPC ................ 356/139.06; 356/141.5; 356/141.4; 356/5.08

(58) Field of Classification Search
CPC ..... G01S 17/66; G01S 7/4811; G01S 7/4812; G01S 7/4813
USPC ............................ 356/29, 140–141.5, 139.06
See application file for complete search history.

(56) References Cited

U.S. PATENT DOCUMENTS

| 2,942,118 | A | * | 6/1960 | Gedance .................... 250/203.6 |
| 3,542,477 | A | * | 11/1970 | Grey et al. ................ 356/139.06 |
| 3,781,111 | A | * | 12/1973 | Fletcher et al. ............. 356/5.08 |
| 4,427,880 | A | * | 1/1984 | Kanade et al. ............. 250/222.1 |
| 4,562,769 | A | * | 1/1986 | Heynau et al. ............... 89/41.06 |
| 4,965,453 | A | * | 10/1990 | Hoschette et al. ............ 250/349 |

(Continued)

FOREIGN PATENT DOCUMENTS

WO    2007129047 A1    11/2007

OTHER PUBLICATIONS

Perrin, S. et al., "Laser-Based Finger Tracking System Suitable for MOEMS Integration," Image and Vision Computing, New Zealand, Palmerston North, Nov. 2003, pp. 131-136.

(Continued)

*Primary Examiner* — Luke D Ratcliffe
*Assistant Examiner* — Ari M Diacou
(74) *Attorney, Agent, or Firm* — Nixon Peabody LLP

(57) ABSTRACT

A device for measuring the position of at least one moving object in a three-dimensional grid. The device comprises: at least one optical head comprising an independent laser sources array outputting collimated laser beams, arranged about a central photodetector with a single sensitive cell; at least one movable base with two rotational degrees of freedom whereto said array is secured; and control electronics.

14 Claims, 7 Drawing Sheets

(56) References Cited

U.S. PATENT DOCUMENTS

| | | | |
|---|---|---|---|
| 5,237,384 A * | 8/1993 | Fukunaga et al. | 356/139.06 |
| 5,268,734 A * | 12/1993 | Parker et al. | 356/139.06 |
| 5,325,386 A * | 6/1994 | Jewell et al. | 372/50.124 |
| 5,465,142 A * | 11/1995 | Krumes et al. | 356/5.01 |
| 5,486,926 A * | 1/1996 | Hausler | 356/623 |
| 5,563,710 A * | 10/1996 | Webb et al. | 356/445 |
| 5,892,575 A * | 4/1999 | Marino | 356/5.01 |
| 6,147,748 A * | 11/2000 | Hughes | 356/4.09 |
| 6,396,577 B1 * | 5/2002 | Ramstack | 356/141.1 |
| 6,955,324 B2 * | 10/2005 | Tanielian | 244/3.13 |
| 7,230,689 B2 * | 6/2007 | Lau | 356/73 |
| 7,405,834 B1 * | 7/2008 | Marron et al. | 356/521 |
| 2003/0016348 A1 * | 1/2003 | Sallee | 356/141.1 |
| 2006/0222314 A1 * | 10/2006 | Zumbrunn et al. | 385/147 |

OTHER PUBLICATIONS

Perrin, S. et al., "Gesture Recognition Using Laser-Based Tracking System," Proceedings on the Sixth IEEE International Conference on Automatic Face and Gesture Recognition, May 2004, pp. 541-546.

Poujouly, S. et al., "Laser Range Finder Based on Fully Digital Phase-Shift Measurement," IMTC/99, Proceedings of the 16th IEEE Instrumentation and Measurement Technology Conference, vol. 3, 1999, pp. 1773-1776.

International Search Report and Written Opinion in International Application No. PCT/EP2009/065600, mailed May 6, 2010.

French Search Report in French Application No. FR 0857946, dated Jul. 7, 2009.

\* cited by examiner

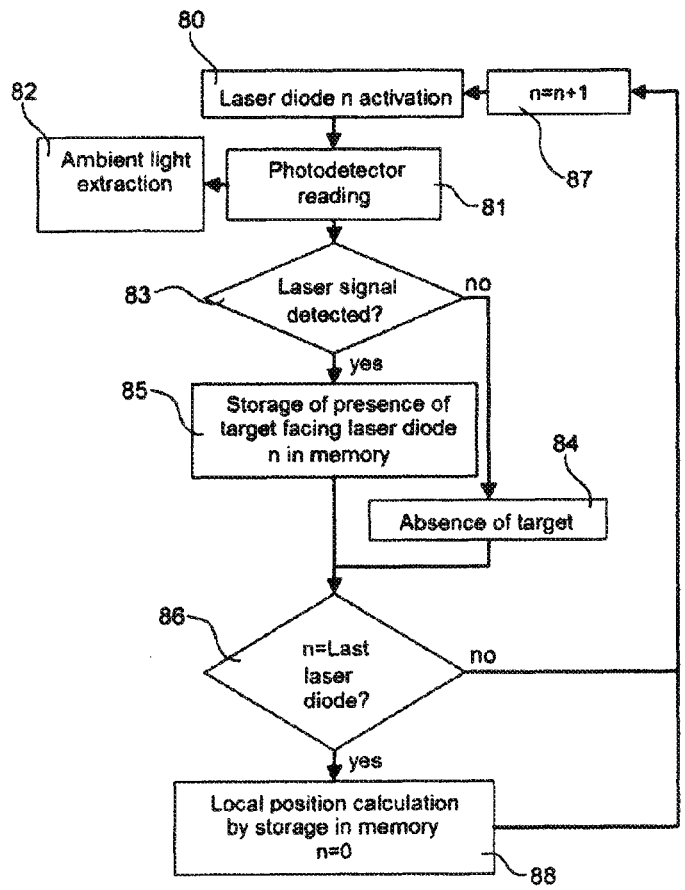
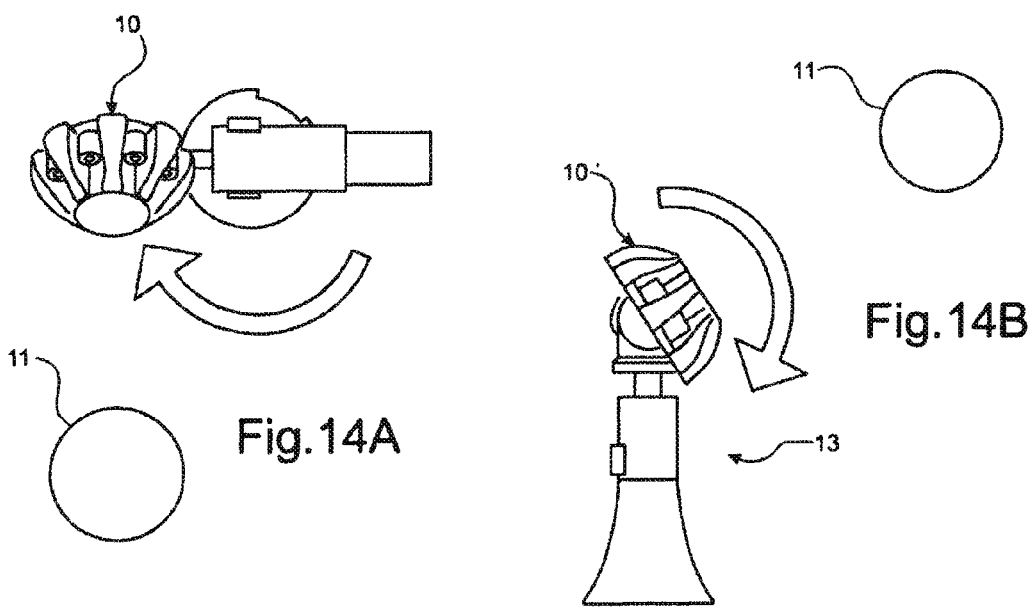
Fig.13
Fig.14A
Fig.14B

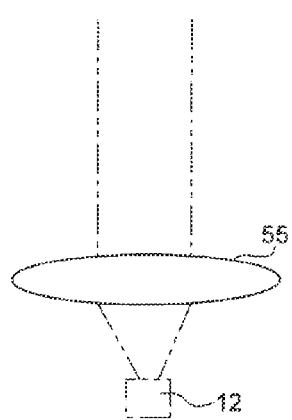
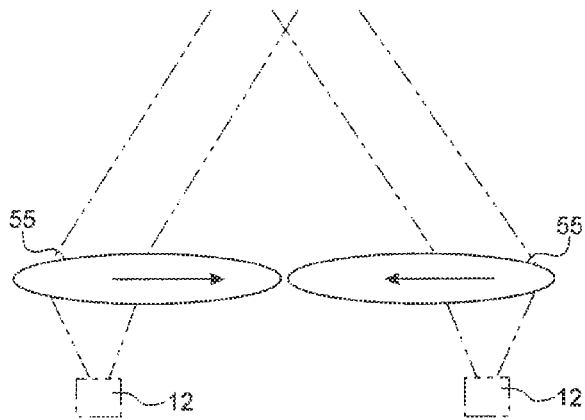
Fig.18A  Fig.18B
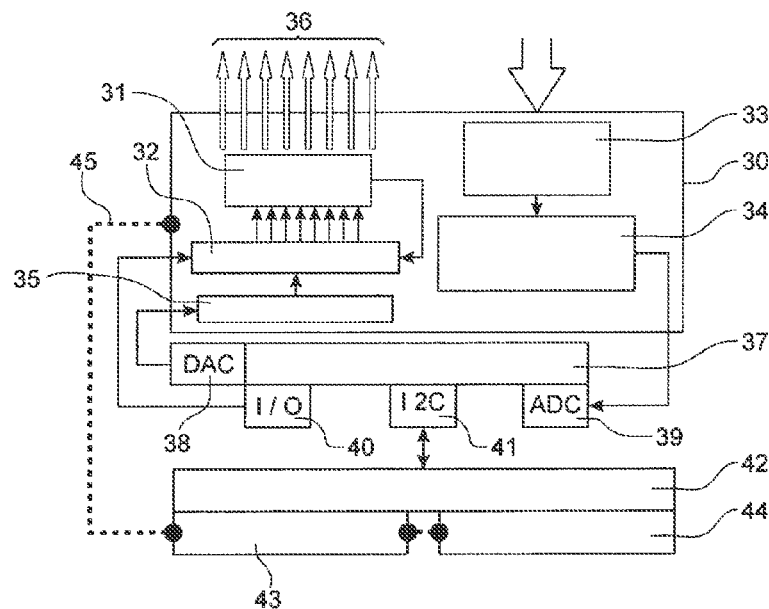
Fig.19

DEVICE AND METHOD FOR MEASURING THE POSITION OF AT LEAST ONE MOVING OBJECT IN A THREE-DIMENSIONAL GRID

CROSS REFERENCE TO RELATED APPLICATIONS or PRIORITY CLAIM

This application is a National Phase of PCT/EP2009/065600, filed Nov. 23, 2009, entitled, "DEVICE AND METHOD FOR MEASURING THE POSITION OF AT LEAST ONE MOVING OBJECT IN A THREE-DIMENSIONAL COORDINATE SYSTEM", and which claims priority of, French Patent Application No. 08 57946, filed Nov. 24, 2008, the contents of which are incorporated herein by reference in their entirety.

1. Field Of The Invention

The invention relates to a device and a method for measuring the position of at least one object, or target, moving in a three-dimensional grid, using an independent laser source array.

2. State Of The Related Art

Laser technology has numerous advantageous properties: high robustness to external conditions: magnetic fields, lights, sound waves, etc. due to the high power density and selectivity thereof; high precision due to the directivity thereof; and an extensive bandwidth due to the high operating speed of optronic devices. Due to such features, laser technology is particularly suitable for metrology requirements. However, this technology results in very costly tracking devices when they attain a very high precision: less than 25 μm.

In the devices according to the prior art, colour-sensitive passive camera systems require controlled brightness conditions and need to be calibrated. Furthermore, the discrimination of targets requires complex hardware and software resource-intensive algorithms. Robustness in respect of brightness conditions is enhanced due to cameras sensitive to the infrared light emitted on retroreflective markers.

A laser tracking device according to the prior art described in the document referenced [1] at the end of the description, which is a high-precision and high dynamic range laser metrology device, requires the use of costly specific markers (for example a corner cube prism). The assembly, which is dedicated to industrial metrology, is not suitable for use for motion capture in a man-machine interaction context.

The prior art documents referenced [2] and [3] at the end of the description, describe a markerless laser interface, dedicated to man-machine interaction. These documents more specifically describe a tracking device using a laser diode, guiding mirrors and a single non-imaging photodetector. Tracking is based on the analysis of a time signal corresponding to the amount of backscattered light produced during rapid circular scanning about the presumed position of the object. Despite the technical simplicity of this device, the scanning assembly used, consisting of a galvanometric motor, is energy-intensive and very costly due to the high dynamic range and precision required. Furthermore, the measurement field proves to be limited by the travel of the mirrors mounted on the galvanometric motors and by the restricted observation angle of the detector.

The aim of the invention is that of remedying these drawbacks by proposing a measurement device and method operating in a millimetric precision range for a man-machine interface, enabling contactless and markerless measurement of the movement of at least one object, without accounting for the surrounding medium, with a relatively low cost and low consumption enabling the use of batteries.

DESCRIPTION OF THE INVENTION

The invention relates to a device for measuring the position of at least one moving object in a three-dimensional grid, characterised in that it comprises:
  at least one optical head comprising an independent laser sources array outputting collimated laser beams, arranged about a central photodetector with a single sensitive cell,
  at least one movable base with two rotational degrees of freedom whereto said array is secured,
  control electronics comprising:
  serial laser source switching means for tracking the object,
  means for continuously adjusting the angles of the movable base to align the centre of the photodetector with the centre of the object.

In one embodiment, the movable base comprises two geared motors mounted in a "tilt/pan" configuration.

In a second embodiment, the movable base comprises a universal joint type mechanical link. An array of such movable bases can thus be used to track a plurality of targets.

Advantageously, the laser sources array is a VCSEL array and the laser sources are laser diodes. The optical head may thus comprise:
  collimated laser diodes,
  a photodiode,
  an analog multiplexer,
  a transimpedance amplifier and inverter,
  a control circuit.

Advantageously, the control electronics comprise:
  a microcontroller,
  a digital-analogue converter,
  an analog-digital converter,
  a digital input/output module,
  a communication module,
  a regulation and power control circuit.

Advantageously, the device according to the invention comprises a lenses array positioned in front of the laser sources array and movable in a linear manner in front of same.

The invention also relates to a method for measuring the position of at least one moving object in a three-dimensional grid using a device for measuring the position of said at least one object comprising:
  at least one optical head comprising an independent laser sources array outputting collimated laser beams, arranged about a central photodetector with a single sensitive cell,
  at least one movable base with two rotational degrees of freedom thereto said array is secured,
  characterised in that it comprises;
  a static and local scanning step with laser source switching for tracking the object,
  an overall tracking step of said at least one object performed by consulting both axes of a movable base of said array to continuously adjust the angles of said movable base in order to align the centre of the photodetector with the centre of the object.

Advantageously, this method further comprises a step for measuring depth carried out using a time-of-flight telemetry method.

The invention may have numerous applications in the field of virtual reality and, more generally, man-machine interactions, i.e. any industrial applications requiring the measurement of the trajectory of a target in an uncontrolled surrounding medium.

BRIEF DESCRIPTION OF THE FIGURES

FIG. 13 illustrates the optical head processing algorithm.

FIGS. 14A, 14B and 15 illustrate the operation of the movable base in the first embodiment of the device according to the invention.

FIGS. 18A and 18B illustrate the linear movement of a lens array position facing the laser sources.

FIG. 19 illustrates a general architecture of the common electronics for the two embodiments of the device according to the invention.

DETAILED DESCRIPTION OF PARTICULAR EMBODIMENTS

The invention relates to a device for measuring the position of an object, or target, moving in a three-dimensional grid. This device comprises an independent laser sources array, oriented by means of a movable base with two rotational degrees of freedom. Advantageously, this array is a VCSEL (i.e. "Vertical Cavity Surface Emitting Laser") array, as described in the document referenced [4]. The motion capture is broken down into a static and local measurement step by means of the collimated lasers of the array, an overall measurement step performed by consulting the angular position of both axes of the movable base, and optionally a step for measuring depth carried out using a time-of-flight telemetry method. Such a depth measurement based on a phase-shift method is described in the document referenced [5].

In this way, in the device according to the invention, the rapid scanning operation, performed by galvanometric motors in the documents referenced [2] and [3], is obtained by the successive circuiting of the laser sources of the array, thus enabling static scanning The laser sources array is then oriented so as to centre the imprint formed on the target. By measuring the position of movable base orienting said array, we come back to the position of the target. A time-of-flight measurement may then enable a measurement of the depth (distance) of the target.

The use of a low-cost VCSEL array makes it possible to avoid using a frequently costly high-precision electromechanical device. It enables static local scanning whereas overall target tracking motion can be provided by more commonly used actuators such as electric motors or other actuations having lower performances in terms of precision and dynamic range.

Figure 1:
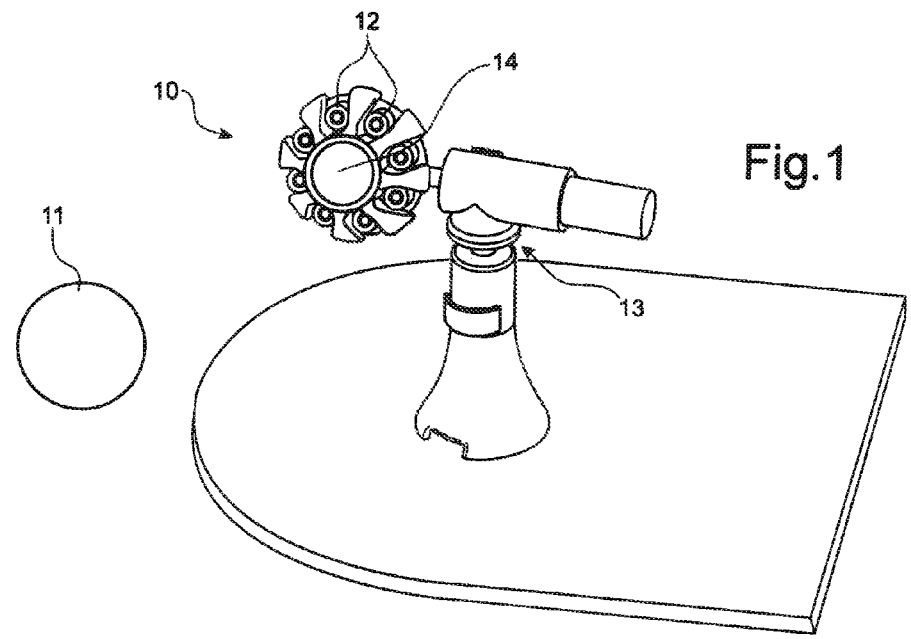
FIG. 1 illustrates a first embodiment of the device according to the invention.

In a first advantageous embodiment, the device according to the invention comprises an optical local scanning head 10, which, as illustrated in FIG. 1, comprises an array of laser diodes 12 arranged about a central photodetector with a single sensitive cell 14 on the movable base 13. This movable base 13 comprises two geared motors mounted in a "tilt/pan" configuration thus offering two rotational degrees of freedom.

A strategy for the serial switching of these laser diodes makes it possible to track the identified target. The optical head 10 secured on the movable base 13 enables movement along two axes, over 180° for the horizontal axis and over 360° for the vertical axis, motorised with position return for tracking purposes, enabling continuous adjustment of the "tilt/pan" angles such that the centre of the photodetector 14 remains aligned with the centre of the tracked object 11, or target.

The separation of the scanning and tracking functions makes it possible, in relation to the devices according to the prior art, to reduce the cost and energy consumption of the system.

These local scanning and overall tracking functions will now be studied in succession.

Local Scanning

Figure 2:
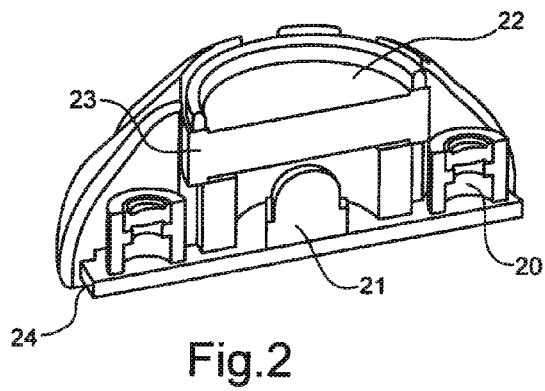
FIG. 2 illustrates sectional view of the optical head of the device according to the invention illustrated in FIG. 1.

The device according to the invention enables "local" detection of the target. The optical head 10 contains localised laser sources 12, for example laser diodes, and the sole photodetector 14 topped with optical filtering. The transmission and reception signals are conditioned via compact electronics. FIG. 2 thus illustrates a sectional view of an example of an optical head 10, with:
- a collimated laser diode 20,
- a photodiode 21,
- a red filter 22,
- an infrared filter 23,
- an electronic pre-conditioning card 24.

Figure 3:
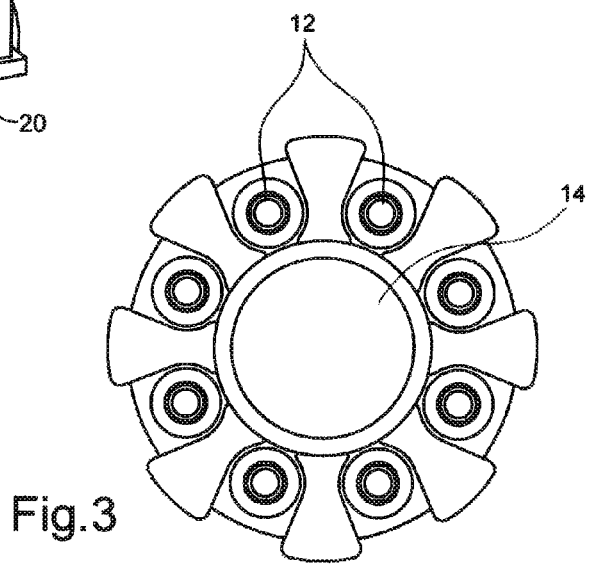
FIG. 3 illustrates the arrangement of the various laser sources of an array in this optical head.
Figure 4:
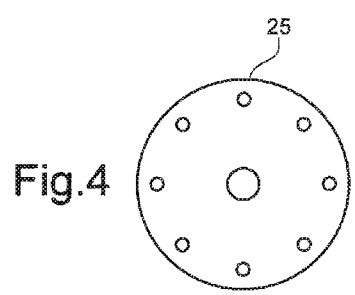
FIGS. 4 to 7 illustrate various laser imprint configurations.
Figure 5:
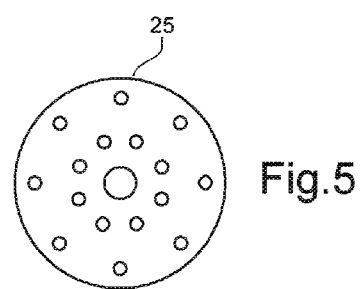
Figure 6:
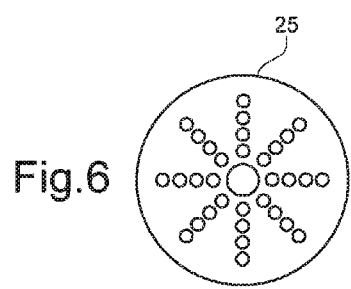
Figure 7:
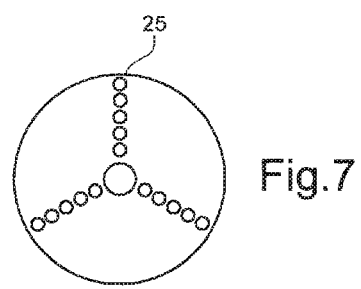
Figure 8:
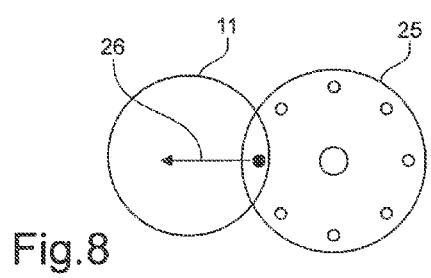
FIGS. 8 to 11 illustrate various positions between the target and the optical head.
Figure 9:
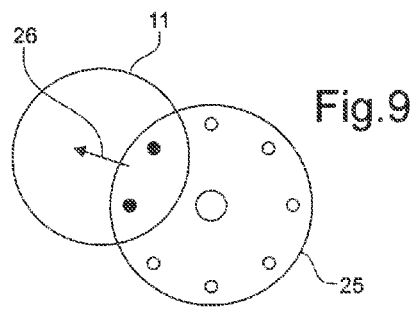
Figure 10:
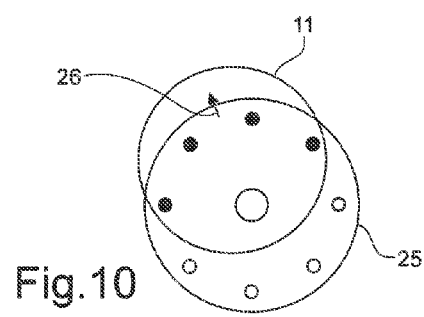
Figure 11:
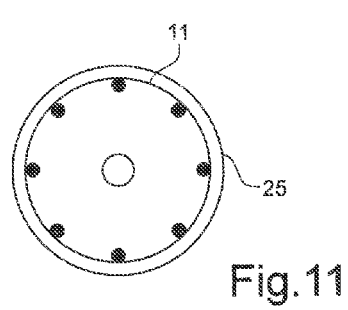

The laser sources 12 are arranged in a circle as illustrated in FIG. 3 and emit parallel collimated beams. The photodetector 14, situated in the middle of these laser sources, may be a photodiode, for example a conventional photodiode, a PIN photodiode or an avalanche photodiode.

According to the target 11 to be tracked, various laser imprint configurations 25 may be envisaged, as illustrated in FIGS. 4 to 7.

FIGS. 8 to 11 show various positions between the target 11 and such a laser imprint 25, with an associated position error vector 26.

Figure 12A:
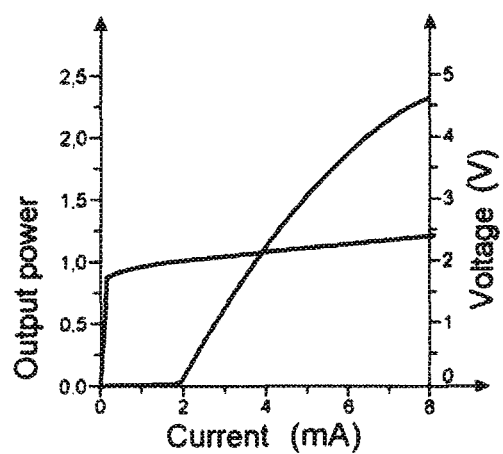
FIGS. 12A and 12B illustrate the current/voltage characteristics and the electrical diagram of the laser diode multiplexing, respectively.
Figure 12B:
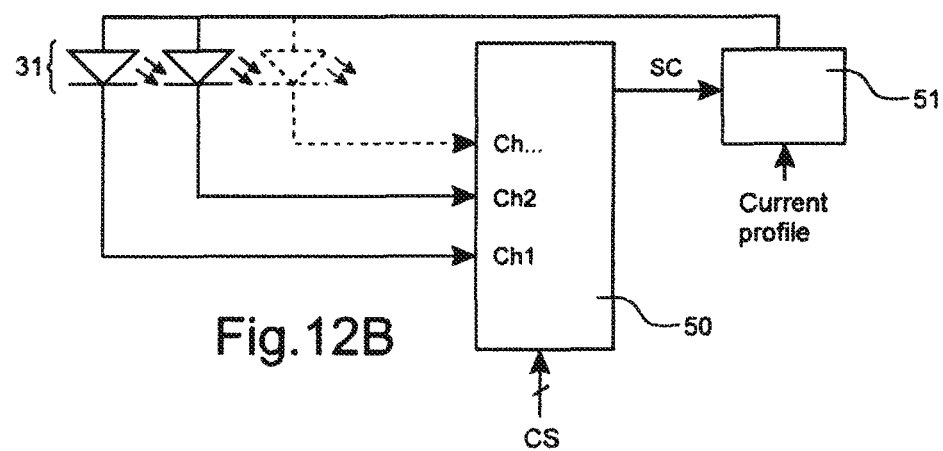

FIG. 12B shows an electric diagram of the multiplexing 50 of the laser diodes 31 with a current driver 51 (control device). Indeed, given the wide current variation illustrated in FIG. 12A occurring as a function of the voltage, a current regulation approach is suitable for managing a stable optical power. A main feature of VCSEL arrays lies in a low switching current close to 2 mA, involving a fine adjustment regulation assembly. An operational amplifier in current regulation mode is thus used as a current driver 51. The serial switching means are such that a single laser diode is circuited at the same time. In order to reduce the complexity, size and tedious adjustment, the current driver 51 is tracked by an analogue multiplexer 50 supplying the signal to all the laser diodes 31, CS being the channel selector, SC the selected channel, as illustrated in FIG. 12B.

FIG. 13 shows an optical head processing algorithm.

This algorithm makes it possible to account for each of the laser diodes of the array. This gives the following successive steps:
- activation of a laser diode having the number n (module 80),
- reading of the central photodetector (module 81), extracting the ambient light (module 82), test to determine whether a laser signal has been detected (module 83), with absence of target (module 84) if the response is no, storage in memory of the presence of a target facing the laser diode n if the response is yes (module 85), verification to determine whether the diode n is the last diode to be taken into account (module 86), with the addition n=n+1 (module 87) if the response is no, calculation of the local position by storage in memory and reset of n (module 88) to zero if the response is yes.

Overall Tracking

In the first embodiment, the device according to the invention comprises a "tilt/pan" movable base 13 for orienting the optical head 10 for tracking with a wider field.

Figure 15:
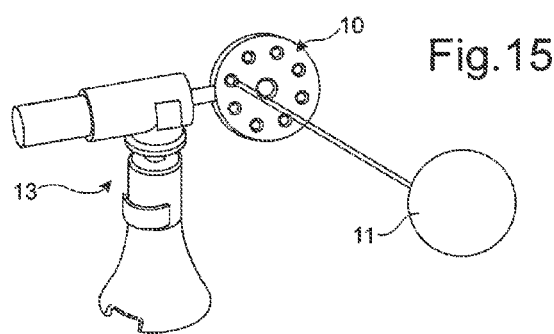

The kinematic "tilt/pan" configuration makes it possible to give the optical head 10 two rotational degrees of freedom, as illustrated in FIGS. 14A and 14B. This configuration enables the scanning of a hemispherical volume as illustrated in FIG. 15. The selected actuators may be two direct current geared motors.

Figure 16A:
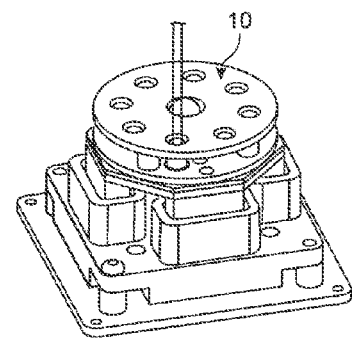
FIGS. 16A and 16B shows a second embodiment of the device according to the invention with a movable base with two degrees of freedom.
Figure 16B:
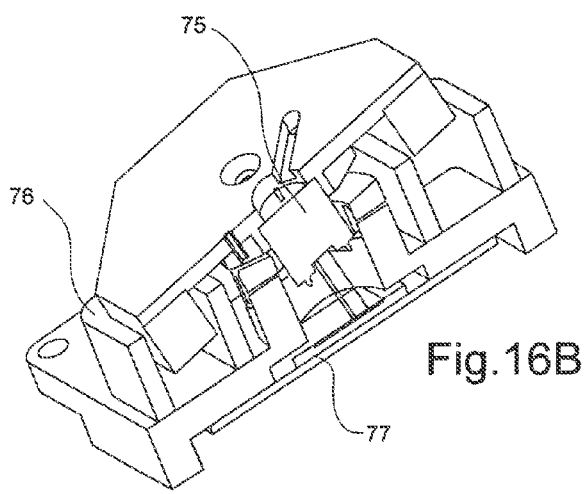
Figure 17:
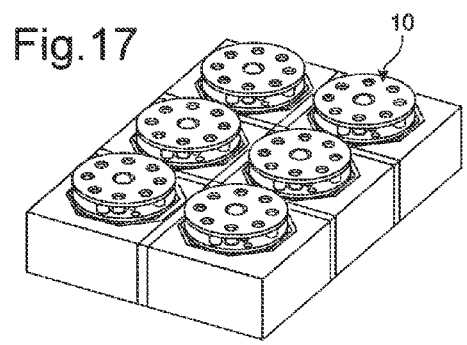
FIG. 17 shows an array configuration of this second embodiment for tracking a plurality of targets.

FIGS. 16A and 16B show a second possible embodiment with a platform with two degrees of freedom with an electromagnetic actuator. The optical head 10 is oriented along two degrees of rotation about a universal joint mechanical link and the position thereof is monitored by means of a collimated laser beam on a PSD ("Position Sensitive Detector") position detector. In these figures, a laser diode 75, an actuator 76 and a position sensor 77 are thus represented. FIG. 17 shows a configuration in an array of platforms as illustrated in FIGS. 16A and 16B for simultaneously capturing the position of a plurality of targets.

In one alternative embodiment, illustrated in FIGS. 18A and 18B, the device according to the invention comprises an array of lenses 55 positioned in front of the laser diodes 12 suitable for moving in a linear fashion and along the XY axes, in the plane perpendicular to the laser sources. Such movements are very small, and make it possible to choose the tilt of the laser sources. The actuation of this lens array may be electromagnetic, piezoelectric, magnetostrictive, thermal bilayer, shape memory alloys, etc.

A general architecture, illustrated in FIG. 19, of the electronics of the first embodiment of the device according to the invention, illustrated in FIG. 1, comprises:

the optical head 30, comprising:
a plurality of laser diodes 31, in this case eight, outputting the laser beams 36,
an analog multiplexer 32,
a PIN photodiode 33,
a transimpedance amplifier and inverter 34,
a laser diode control circuit (or "driver") 35,
a microcontroller 37,
a digital-analog converter 38,
an analog-digital converter 39,
a digital input/output module 40,
a communication module, for example I2C, 41,
a regulation and power control circuit ("driver") 42,
a "tilt" geared motor (DC motor) 43,
a "Pan" geared motor (DC motor) 44,
with a mechanical link 45 between the optical head 30 and these motors 43 and 44.

The microcontroller 37 handles any interactions between the various modules illustrated in FIG. 19. The software resource is divided into two tasks such that:

the microcontroller 37 handles the optical head 30 by modulating the laser diode current. This operation is repeated for each diode by shifting the channel of the analog multiplexer 32;

the microcontroller 37 handles the overall regulation strategy, which consists of processing a PID algorithm. Low-level commands are sent with an I2C protocol to the movable base regulation stage.

Figure 20:
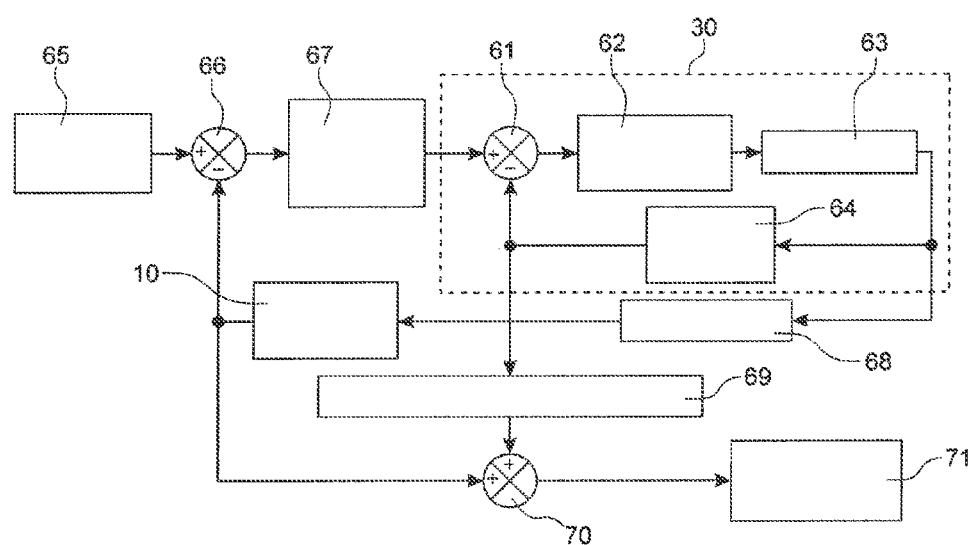
FIG. 20 schematically illustrates two control loops for controlling the two common actuators for the two embodiments of the device according to the invention (the control loops and the structure are similar for the two embodiments of the invention).

FIG. 20 schematically represents two control loops for controlling two actuators.

The first loop 60 is a closed angular speed loop refreshed every 0.5 ms to control the dynamic range of the movable base. It comprises:
a subtractor 61,
a PID controller 62 required to maintain stability and minimise error,
DC motors 63,
an angular encoder 64.

The second loop, refreshed every 5 ms, uses the optical head 10 as a position sensor for controlling the movable base 13. FIG. 19 thus represents:
the target position 65,
a subtractor 66,
a 1/Ko PID controller module 67,
the scanning head 10,
a module Ko=f (depth) 68,
a module Ko2=f (depth and angular encoder) 69,
a summer 70,
a measured position 71.

The target position 65 represents the desired input. The system output is the measured position 71. This value consists of the absolute angular position given by the encoders and the position error measured by the optical head 10.

References

[1] US 2006/0222314

[2] "Laser-Based Finger Tracking System Suitable for MOEMS Integration" by Stéphane Perrin, Alvaro Cassinelli and Masatoshi Ishikawa (University of Tokyo, Ishikawa Hashimoto Laboratory, November 2003)

[3] "Gesture Recognition Using Laser-Based Tracking System" by Stéphane Perrin, Alvaro Cassinelli and Masatoshi Ishikawa (University of Tokyo, Ishikawa Hashimoto Laboratory, IEEE 2004))

[4] U.S. Pat. No. 5,325,386

[5] "Laser Range Finder based on Fully Digital Phase-Shift Measurement" by S. Poujouly, S. Journet and B. Miller (1999, LESiR/ENS Cachan, France IEEE).

The invention claimed is:

1. Device for measuring the position of at least one moving object in a three-dimensional grid, which comprises:
at least one optical head comprising an independent laser source array outputting collimated laser beams, arranged about a central photodetector with a single sensitive cell,
at least one movable base with rotational degrees of freedom whereto said array is secured,
control electronics comprising:
serial laser source switching means for tracking the object,
means for continuously adjusting the angles of the movable base to align the centre of the photodetector with the centre of the object.

2. Device according to claim 1, wherein the movable base comprises two geared motors mounted in a "tilt/pan" configuration.

3. Device according to claim 1, wherein the movable base comprises a universal joint type mechanical link.

4. Device according to claim 3, comprising a movable bases array.

5. Device according to claim 1, wherein the laser sources array is a VCSEL array.

6. Device according to claim 1, wherein the laser sources are laser diodes.

7. Device according to claim 1, wherein the optical head comprises:
   collimated laser diodes,
   a photodiode,
   an analog multiplexer,
   a transimpedance amplifier and inverter,
   a control circuit.

8. Device according to claim 1, wherein the control electronics comprise:
   a microcontroller,
   a digital-analog converter,
   an analog-digital converter,
   a digital input/output module,
   a communication module,
   a regulation and power control circuit.

9. Device according to claim 1, comprising a lenses array positioned in front of the laser sources array and movable in a linear manner in front of same.

10. Method for measuring the position of at least one moving object in a three-dimensional grid using a device for measuring the position of said at least one object comprising:
   at least one optical head comprising an independent laser sources array outputting collimated laser beams, arranged about a central photodetector with a single sensitive cell,
   at least one movable base with two rotational degrees of freedom whereto said array is secured,
   characterised in that it comprises;
   a static and local scanning step with laser sources switching for tracking the object,
   an overall tracking step of said at least one object performed by consulting both axes of a movable base of said array to continuously adjust the angles of said movable base in order to align the centre of the photodetector with the centre of the object.

11. Method according to claim 10, further comprising:
   a step for measuring depth carried out using a time-of-flight telemetry method.

12. Method according to claim 10, wherein the array is a VCSEL array.

13. Method according to claim 10, wherein the movable base is "tilt/pan" type.

14. Method according to claim 10, comprising a linear movement step of a lenses array in front of the laser sources array.

* * * * *